United States Patent [19]

Frolov et al.

[11] 4,292,460
[45] Sep. 29, 1981

[54] ELECTRODE-SLIPPING APPARATUS FOR ELECTRIC FURNACES

[76] Inventors: Jury F. Frolov, M. Muranovskaya ulitsa 11, korpus 1, kv.29, Moscow; Nariman A. Sukoian, Pamirskaya ulitsa, 48, kv.78, Novosibirsk; Ivan T. Proshkin, ulitsa Zorge, 5, kv. 30, Novosibirsk; Anany M. Basalaev, ulitsa Rimskogo Korsakova, 7/1, kv. 15, Novosibirsk, all of U.S.S.R.

[21] Appl. No.: 42,339

[22] Filed: May 25, 1979

Related U.S. Application Data

[63] Continuation-in-part of Ser. No. 748,536, Dec. 8, 1976, abandoned.

[51] Int. Cl.$^3$ .................................................. H05B 7/10
[52] U.S. Cl. .................................................. 13/14; 13/16
[58] Field of Search .................................. 13/13–17

[56] References Cited

U.S. PATENT DOCUMENTS

| | | | |
|---|---|---|---|
| 2,896,003 | 7/1959 | Eaton | 13/16 X |
| 2,903,494 | 9/1959 | Meffert | 13/16 X |
| 3,213,176 | 10/1965 | Krogsrud | 13/16 |

*Primary Examiner*—Roy N. Envall, Jr.
*Attorney, Agent, or Firm*—Lackenbach, Lilling & Siegel

[57] ABSTRACT

An electrode-slipping apparatus for electric furnaces comprises an electrode, a hydraulic hoist with electrode-slipping hydraulic mechanisms mounted thereon, a locking ring, contact shoes with a clamp and hydraulic clamping mechanisms, a locking ring control valve, a slide valve for controlling the electrode-slipping hydraulic mechanisms, a hydraulic fluid pressure control unit and a programming unit. According to the invention, there is provided between the electrode-slipping mechanisms and the slide valve in the hydraulic fluid pressure and drain line a sliding spool flow control valve for continuously effecting the meter-out flow control in the electrode-slipping hydraulic mechanisms coupled to the programming unit.

11 Claims, 2 Drawing Figures

ELECTRODE-SLIPPING APPARATUS FOR ELECTRIC FURNACES

This is a continuation in-part patent application, of application Ser. No. 748,536, filed Dec. 8, 1976, now abandoned.

BACKGROUND OF THE INVENTION

1. Field of the Invention

The invention relates to the construction of electric furnaces and, more particularly, to an electrode-slipping apparatus for use in such furnaces. The invention is readily adaptable for application in ferrous and nonferrous electrometallurgy, as well as in the chemical industry where use is made of electric furnaces furnished with self-baking or pressed electrodes.

Electric ore-smelting furnaces are equipped with pressed (carbon or graphite) or Soderberg self-baking electrodes. The electrodes in question function as current conductors and the carbonizable material thereof is used as a reducing agent in chemical reactions proceeding in the furnace hearth.

To make up for the burning of electrodes in the furnace hearth, the furnace is provided with electrode-slipping mechanisms.

As a rule, these mechanisms permit an electrode to be slipped by a single step for a length of 80 to 100 mm, the electrode-slipping operation being performed 3-4 times a day.

It has been found by test and trial that the electrode-slipping practice described above is disadvantageous in that it results in the breaking of electric contact between the electrode and the contact shoes. This in turn brings about vigorous liberation of a great amount of heat and leads to substantial losses of electrical energy, whereas rapid displacement of the electrode tip in the furnace hearth upsets normal power conditions as well as process conditions as a whole.

It takes considerable time (one hour and more, depending on the stroke and rate of the electrode slip) to reestablish normal electrical contact and technological process.

With the use of Sonderberg self-baking electrodes, the temperature within the electrode tends to change sharply, thereby affecting the disposition of the coking zone and quality of the electrode coking mass. It often happens in practice that in the course of slipping of the insufficiently baked electrode, the electrode, when extended beyond the boundary of the lower edge of contact shoes, is broken.

As a result, the furnace is rendered inoperative for a long period of time and the yield of the end product is materially diminished. In view of an ever increasing power capacity and production output of electric furnaces, the aforesaid dificiency is utterly condemnable.

It has been found advantageous, as the electrode is consumed in use, to carry out the electrode-slipping procedure in a manner permitting continual slipping of the electrode at a rate equal to that of its consumption.

2. Description of the Prior Art

For example, there is known an electrode-slipping apparatus for use in electric furnaces (cf. U.S.S.R. Inventor's Certificate No. 182,749). This apparatus comprises steel bands welded to a metal casing of self-baking electrode, and gripping means. The apparatus of this type has been found suitable for use in electric furnaces with a power capacity ranging from 6.5-7.5 to 12.5 mvA. Here, the electrode is slipped intermittently at half-an-hour intervals for a length of 12 mm, or at intervals of 45 min for a length of 16 mm. This electrode-slipping method proved inefficient due to the outdated construction of the device for effecting same, and is also unsuitable for use in electric furnaces of higher power capacity.

There is also known an electrode-slipping apparatus (cf. catalog "ING Leone Tagliaferri", Italy), which comprises a slide valve set in the hydraulic fluid pressure and drain line of the electrode-slipping hydraulic mechanisms, a slide valve and pressure-reducing valves set in the hydraulic fluid pressure and drain lines of a hydraulic mechanism for actuating contact shoes, and a programming unit.

With this apparatus it becomes possible to effect the electrode-slipping operation intermittently at a rate of 30 to 40 mm per hour at carbide furnaces operating under steady-state conditions and wherein the automatic power regulator means is cut off with the aid of the same hydraulic cylinders used for automatic power control, effected through displacement of the electrode. At the moment of slip, the electrode retains its original position while the contact shoes are slidably moved upwardly along the electrode.

The apparatus described above is disadvantageous in that it fails to provide for automatic electrode slipping operation under loading conditions, and does not ensure steady-state operating conditions of an electric furnace.

In addition, the aforedescribed devices fail to ensure production of high-quality electrodes.

Furthermore, there is no future for devices which comprise bands, since their application is associated with larger operating heights of shopworks required to enable installation of electric hoists on a special floor above the electrode-slipping mechanism. An increase in the height of a workshop by 4 to 6 m is economically unprofitable.

The Wisdom band-utilizing device operates under the action of the electrode weight. The bands required to support the electrode are unwound from a reel actuated by a drive means, and are then pulled through a system of grip blocks solely under the action of the electrode gravity. If, however, the electrode is stuck in the area of a contact assembly, this being quite a frequent occurrence with spring-biased power-driven contact shoes, then, in this case, the tension of the bands will decrease to result in the collapse of the electrode, which, in turn, may result in the breaking of the bands; in other words, a constant control over the device operation and a safe blocking system are required, which makes the apparatus as a whole complicated in operation.

To avoid the electrode jamming, it has become an adopted practice to release springs acting to press the contact shoes against the electrode surface.

However, the contact between the contact shoes and the electrode is impaired, power losses are increased at a point of contact and the life service of the contact shoes is markedly decreased. In the case of electric furnaces with a power capacity of 16.5 mvA and over, wherein the current in the electrode is as high as 60,000 A and above, the loosening of contact between the contact shoes and the electrode during steady-state operation of the furnace is absolutely impossible.

The electrode-slipping device employing steel bands is in constant demand for additional use of manual labour and higher consumption of metal. Even with faultless operation of its mechanisms and programming unit, a constant control and periodic welding of the steel band to the electrode casing is required as the electrode is consumed in use. This in turn leads to an excessive consumption of metal required for the bands and welding electrodes. There are known technological processes (for example, production of aluminosilicate) where even a small amount of iron in the furnace bath is highly undesirable, since it impairs the quality of the and product.

The steel bands welded intermittently to the surface of the electrode casing get between the contact shoes, thereby impairing their contact with the electrode and thus increasing the rate of wear of the contact surface of the contact shoes.

Therefore, the prior-art device for carrying out the method of continual slipping of electrode through the use of bands is but a partial solution to the existing problem and lacks universality. To be more exact, the device in question is suitable solely for slipping self-baking electrode by means of bands in accordance with the Wisdom system. A pressed electrode, for example, is impossible to suspend and slip by means of bands.

The band operating device makes it possible to effect only downward slipping of electrode, preventing return or upward movement thereof, for instance, in a case of its breaking.

In the above-described device no provision is made to ensure the independence between the rate of the electrode slipping and the rate of its consumption.

SUMMARY OF THE INVENTION

It is an object of the present invention to provide for automatic continual slipping of an electrode under loading conditions.

Another object of the invention is to stabilize electrical loading as well as process conditions.

Still another object of the invention is ensure automatic continual slipping of an electrode for use in electric furnaces operating either under steady-state or heavy-duty conditions.

It also an object of the invention to improve coking conditions for self-baking electrodes, as well as to improve its quality and prevent the electrode from breaking.

Yet another object of the invention is to make the most of the furnace power capacity and to enhance its production efficiency.

The foregoing and other objects and features of the invention are attained in an electrode-slipping apparatus for use in electric furnaces, comprising an electrode, a hydraulic hoist with electrode-slipping mechanisms mounted thereon and connected with a locking ring, contact shoes connected with a hydraulic-driven clamp and rigidly connected with the hydraulic hoist, a locking ring control slide valve set in the hydraulic fluid supply line of the locking ring and connected therewith, a slide valve intended for controlling the electrode-slipping hydraulic mechanisms and set in the hydraulic fluid pressure and drain line of the electrode-slipping hydraulic mechanisms and connected therewith, a hydraulic pressure control unit intended to actuate pressure-reducing valves and the slide valves and set in the hydraulic fluid pressure and drain line of the hydraulic clamping mechanisms for actuating the contact shoes, and a programming unit. According to the invention, there is provided between the electrode-slipping hydraulic mechanisms and the slide valve in the hydraulic fluid pressure and drain line a sliding spool flow control valve for continuously effecting meter-out flow control in the hydraulic electrode-slipping mechanisms coupled to the programming unit.

A pressure control valve is preferably set in the hydraulic fluid drain line of the slide valve for controlling the hydraulic electrode-slipping mechanisms, provided to maintain a requisite hydraulic fluid pressure head needed to ensure steady operating conditions of the apparatus.

It is also preferable that a hydraulic fluid instantaneous relief valve should be set in the hydraulic fluid drain line of the hydraulic clamping mechanisms for actuating the contact shoes, said relief valve being connected with a programming unit and intended for providing instantaneous pressure relief in the clamping mechanism of the contact shoes.

The clamping mechanism of the contact shoes is preferably connected with an electric sensor means for sensing the electrode position, which is connected to a programming device for following the electrode slipping operation and correcting a length size of its slip.

BRIEF DESCRIPTION OF THE DRAWINGS

The invention will be further described, by way of example only, with reference to the accompanying drawings. In the drawings.

DETAILED DESCRIPTION OF THE INVENTION

Figure 1:
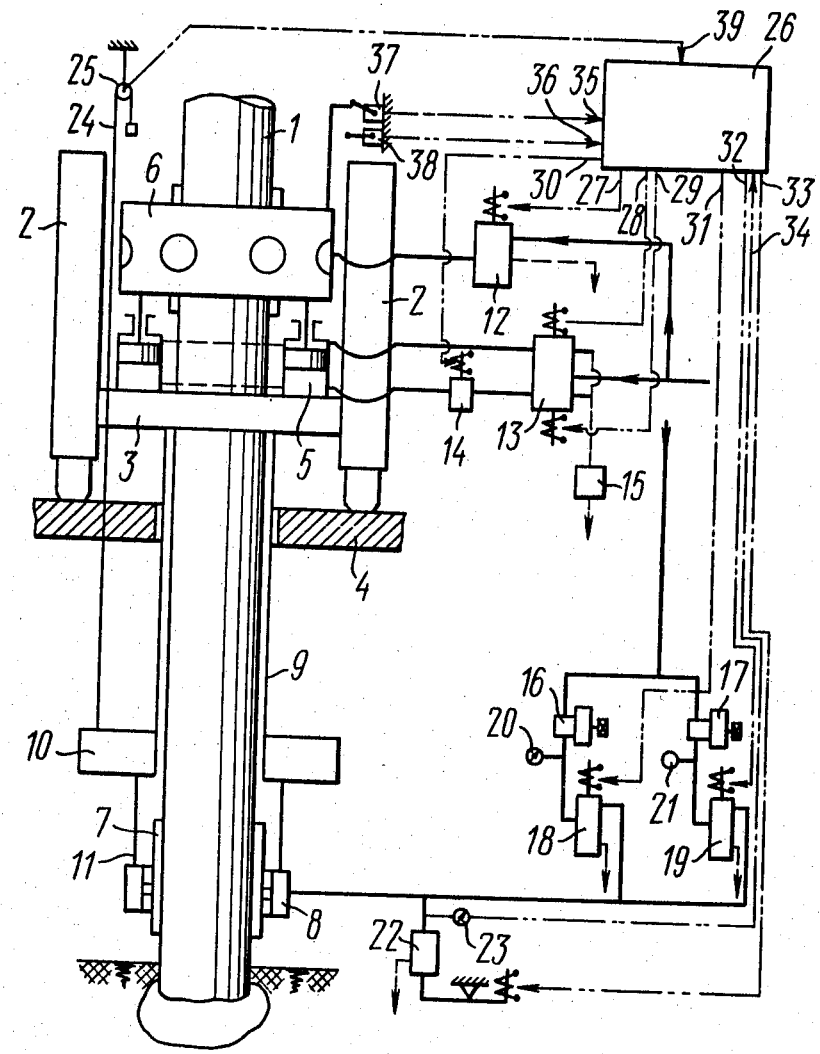
FIG. 1 illustrates an electrode-slipping apparatus for use in electric furnaces, according to the invention.

As illustrated in FIG. 1, the electrode-slipping apparatus comprises an electrode 1, a hydraulic hoist including hydraulic plungers 2 and a cross beam 3 interconnecting the electrode 1 with the plungers 2. The hydraulic plungers 2 are mounted on a support structure 4 which in the given case is a workshop floor. The hydraulic plungers 2 are intended for displacing the apparatus together with the electrode 1 under the action of an automatic power regulator (not shown).

This displacement of the electrode 1 is effected to provide a requisite arc spacing between the electrode tip and a melt, predetermined by voltage and current parameters of the automatic power regulator. Mounted on the cross beam 3 of the hydraulic hoist are electrode-slipping hydraulic mechanisms provided in the form of hydraulic cylinders 5. The hydraulic cylinders 5 are connected with a locking ring 6. The locking ring 6 is provided in the form of a welded metal construction surrounding the electrode 1 with an annular space therebetween. Located or arranged in the annular space are gripping jaws formed with rubber or corrugated steel contact surfaces pressed radially against the electrode 1 by means of clamps provided in the form of plate or helical springs acting to hold the electrode 1 in place and releasing the electrode under the action of hydraulic plungers or bellows (not shown) to which hydraulic fluid under pressure is supplied at a given moment. The peripheral portions in the locking ring 6, shown in FIG. 1, are basically end flanges or covers of the above-described clamping means. The design and operation of the locking ring 6 are well known to those skilled in the art and are elaborately described in various sources both in the U.S.S.R. and elsewhere throughout the world (cf. for instance, B. M. Strunsky, "Ore-Smelting Furnaces", Moscow Publishers, "Metallurgy", 1972, pp. 222-224).

Connected to the cross beam 3 of the hydraulic hoist is a housing 9 with another cross beam 10. Rigidly secured to the cross beam 10 by means of suspensions 11 is a clamp 8 of contact shoes 7.

Set in the fluid pressure supply line of the locking ring 6 is a first slide valve 12 intended to control the locking ring 6 and connected therewith. Set in the hydraulic fluid pressure and drain line of the hydraulic cylinders 5 is a second slide valve 13 intended to control the hydraulic mechanisms actuating the electrode 1.

Set between the hydraulic cylinders 5 and the slide valve 13 is a sliding spool flow control valve 14 intended for continuously effecting the meter-out flow control in the hydraulic cylinders 5. The sliding spool flow control valve 14 is coupled to the hydraulic cylinders 5 and the slide valve 13. The slide valve 13 is also connected with the hydraulic cylinders 5. Set in the hydraulic fluid drain line of the slide valve 13 is a pressure control valve 15 intended to maintain steady operating conditions of the apparatus. A fluid pressure control unit is connected between the hydraulic fluid pressure line and the clamping means 8, having two parallel branches each of which comprises a pressure-reducing valve 16 or 17, a slide valve 18 or 19 and a manometer 20 or 21.

Set in the hydraulic fluid drain line of the hydraulic mechanisms of the clamping means 8 actuating the contact shoes 7 is a hydraulic fluid instantaneous pressure relief valve 22 effective to relieve pressure in the clamping means 8.

The valve 22 is connected with an electric manometer 23. The clamping means 8 is connected through the cross beam 10 by means of a flexible coupling 24 to an electric transducer 25. In the preferred embodiment of the invention the electric transducer 25 is basically a hollow rotor generator of any conventional type.

In the given case the electric transducer 25 is rigidly fixed to the structural member of a workshop. In the preferred embodiment of the invention the flexible coupling 24 is provided in the form of a steel-wire rope with a load fixed on the free end thereof, thereby enabling its tensioning, such as shown in FIG. 1; the steel-wire rope is thrown over a pulley fitted on the output shaft of the microgenerator or electric transducer 25, in other words flexible coupling is effected in a well known manner.

There is provided a programming device 26 having its output 27 coupled to the spool of the slide valve 12, its outputs 28 and 29 connected to the spool of the slide valve 13, its output 30 connected to the sliding spool flow control valve 14, its outputs 31 and 32 connected to the spools of the slide valves 18 and 19, respectively, and its output 33 connected to the instantaneous pressure relief valve 22. An input 34 of the programming device 26 is coupled to the electric manometer 23.

Inputs 35 and 36 of the programming device 26 are respectively connected to end switches 37 and 38 intended for fixing the locking ring 6 in upper and lower positions, said switches being connected to the hydraulic plungers 2 of the hydraulic hoist. The programming device 26 has its input 39 coupled to the electric transducer 25.

The programming device 26 (FIG. 2) comprises a power unit 40 connected to inputs of a time relay 41, a control unit 42 and a dependable correction unit 43. One output of the time relay 41 is connected to one of the inputs of the control unit 42, and the other output thereof serves as the output 30 of the programming device 26. One of the inputs of the dependable correction unit 43 is the input 39 of the programming device 26. The dependable correction unit 43 has one output connected to one of the inputs of the control unit 42 and another output connected to the other input of the time relay 41. The control unit 42 has inputs which serve as the inputs 34, 35 and 36 of the programming device 26, and outputs serving as the outputs 27, 28, 29, 31, 32 and 33 of the programming device 26.

Figure 2:
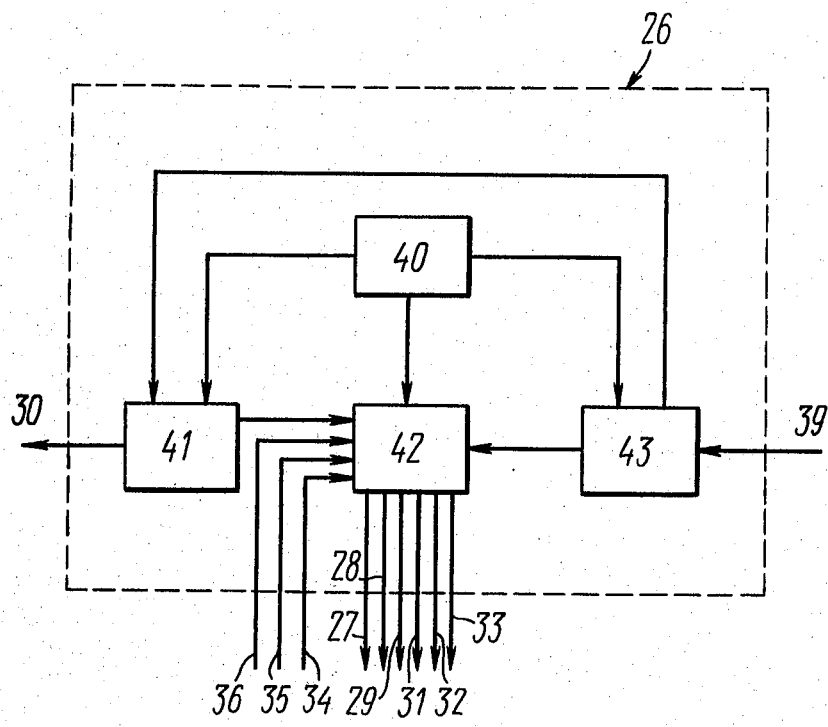
FIG. 2 is a block diagram of a programming unit according to the invention.

In the preferred embodiment of the invention the power unit 40 is a source of direct current or a standard battery; any standard time relay can be used as the time relay 41, such as shown in FIG. 2. The dependable correction unit 43 is provided in the form of a standard intermediate electromagnetic relay, and the control unit 42 may comprise a standard signal-forming amplifier effective to control solenoids of the respective valve spools 12, 13, 18 and 19 the valve 22. Thus, the programming device 26 is made up of conventional structural elements operable to enable the programming device to perform a requisite sequence of operations. Simplicity of construction of the programming device 26 employing standard structural elements renders it reliable and faultless in operation.

The electrode-slipping apparatus of the invention operates in the following manner.

The electrode 1 held in position by means of the locking ring 6 is displaced by the action of the hydraulic cylinders 5 from the uppermost position to the lowermost position. Independantly of this operation, the apparatus together with the electrode 1 is displaced by means of the hydraulic plungers 2 actuated by the automatic regulator (not shown). The uppermost and lowermost positions of the locking ring 6 are determined by the length of the stroke of the pistons of the hydraulic cylinders 5 and are also limited by the end switches 37 and 38.

A hydraulic fluid, such as oil or water-oil emulsion, is drained from the lower chambers of the hydraulic cylinders 5 not by gravity, as is the case with the electrode slipping for a length of 80-100 mm and above, but through a special sliding spool flow control valve 14, electrically controlled and actuated on command from the programming device 26.

The programming device 26 can be embodied in two possible ways, namely, with independent or dependent programs.

With an independent program on, the time relay 41 (FIG. 2) sends a signal to the sliding spool flow control valve 14 (FIG. 1) and simultaneously to the control unit 42 (FIG. 2) which, in turn, sends control signals to the spools of the slide valve 12, 13, 18 and 19 and the valve 22. At the same time a command execution signal is fed through feedback circuits to the control unit 42 from the electric manometer 23 and the end switches 37 and 38.

With a dependent program on, a signal is applied to the dependable correction unit 43 (FIG. 2) from the electric transducer 25. The rotor of the electric transducer 25 commences to rotate under the action of the flexible coupling 24 through a definite angle depending on the downward or upward displacement of the cross beam 10 or of the electrode 1 together with the clamp 8 and contact shoes 7.

Depending on the angle of rotation of the rotor of the electric transducer 25, an electric signal of a given amplitude is generated in its stator, which is then fed to the programming device 26 (FIG. 2). As this happens, the dependable correction unit 43 forms a signal permitting or prohibiting a signal from the time relay 41 to be applied to the sliding spool flow control valve 14 and the control unit 42.

From the sliding spool flow control valve 14 (FIG. 1) hydraulic pressure is drained through the valve spool 13 also being controlled by the programming device 26, and through the pressure control valve 15 connected through a pipeline with a drain tank (not shown). The pressure control valve 15 prevents the hydraulic fluid from being freely drained from the slide valve 13. The pressure control valve 15 is set to a definite pressure value, which is lower than that of the hydraulic fluid drained from the sliding spool flow control valve 14. If the hydraulic fluid drain pressure is in excess of a preset value, the pressure control valve 15 is actuated to stabilize pressure.

At a time when the hydraulic fluid is drained from the lower chambers of the hydraulic cylinders 5, a hydraulic fluid is fed to the upper chambers of the hydraulic cylinders 5 through the slide valve 13, whereby stable additional pressure of a given value is established by means of a pressurized installation (not shown). As the electrode 1 moves in the downward direction, its lower portion passes through the contact shoes 7 not only under the action of its own weight but under the action of the hydraulic cylinders 5 as well.

As the locking ring 6 carrying the electrode 1 reaches its lowermost position, the lower end switch 38 is actuated. At the same time, on command from the lower end switch 38, the programming device 26 is operated to actuate the slide valve 19 and pressure in the clamping means 8, normally fed by the hydraulic fluid through the slide valve 18, reaches the value required for the electrode 1 to be held in position by the contact shoes 7. Under normal operating conditions, pressure in the clamping means 8 is dependent upon the electric contact between the contact shoes and the electrode surface established through the intermediary of the pressure-reducing valve 16 once set to the manometer 20, and, when the electrode 1 is fully gripped by the contact shoes 7, the pressure is mounted by means of hydraulic fluid fed through the pressure-reducing valve 17 also once set to the manometer 21.

Once the spool of the slide valve spool 19 is actuated, the programming device 26 operates to actuate the valve 12 whereupon the locking ring 6 is unclasped under the action of hydraulic fluid, thereby releasing the electrode 1.

Further, the programming unit 26 operates to switch the valve 13 and actuates the sliding spool flow control valve 14 for a time sufficient to enable the passage of hydraulic fluid therethrough, whereby the locking ring 6 is moved to the uppermost position until the upper end switch 37 is brought in operation.

As this happens, the hydraulic fluid is exhausted from the upper chambers of the hydraulic cylinders 5 through the slide valve 13.

After actuating the upper end switch 37, the valves respond in series to the command from the programming device 26, the slide valve 12 is switched off, the hydraulic fluid is drained, whereafter the locking ring 6 is pressed against the surface of the electrode 1, thereby holding it in fixed position; the slide valve 19 is switched off and an excessive pressure in the clamping means 8 is instantaneously decreased by means of the special pressure relief valve 22 to a required value responding to the control signal from the electric manometer 23. Simultaneously, the slide valve 18 is actuated to establish a steady pressure in the hydraulic mechanisms actuating the clamping means 8, required to provide an adequate electric contact.

The continual electrode-slipping process is then resumed and is carried out in accordance with the preset programme of the programming device 26. The electrode 1, responding to the command from the programming device 26, is moved downwardly by means of the sliding spool flow control valve 14 at a desired speed.

According to one embodiment of the invention, the electrode 1 is enabled to slip at a rate of 18 mm per hour, this being effected on command from the programming device 26 to the sliding spool flow control valve 14. According to another program, the electrode 1 is enabled to slip at a rate of 12 mm per hour. Average electrode-slipping rate in the both above-mentioned versions is 0.25 mm and 0.2 mm per min, respectively. Here, the time relay 41 is used as the signalforming element of the programming device 26, which relay is set in a manner to trigger every five minutes, thereby actuating the sliding spool flow control valve 14 and the spool of the slide valve 13 for a period of 1 sec and thus enabling the hydraulic fluid to be drained from the lower chambers of the hydraulic cylinders 5 and the supply of hydraulic fluid to the upper chambers of the hydraulic cylinders 5, the valve spools being alternatingly actuated every 8 minutes for a period of 1 sec.

The time relay 41 can be set to deliver practically any command enabling the electrode 1 to be slipped for a length of 200 to 400 mm per day or more as the electrode is consumed in use, depending on the process requirements of any given electric furnace. It is likewise possible to enable the electrode to be slipped for a length smaller than that mentioned above.

According to another version of the programming device 26, the electrode slipping process is effected in accordance with the position of the electrode tip as it is consumed in use. This being the case, any conventional microgenerator is used as the electric transducer 25, which basically employs the effect of mechanical contact between the electric transducer 25 and the clamping means 8 of the contact shoes 7, which in the final count governs the interdependence between the transducer 25 and the tip of the electrode 1 while consumed in use.

In the event of the upward or downward displacement of the clamping means 8 of the contact shoes 7 together with the cross beam 10 from a preset position, this displacement is transmitted through the flexible coupling 24 to the electric transducer 25. Rotating motion of the rotor of the electric transducer 25 causes change in electric parameters (in this case the current in the rotor of the microgenerator is due to alternate), which changes are formed into electric signal applied to the programming device 26.

In accordance with the second embodiment of the programming device 26, the electrode-slipping mechanism cannot be actuated within the time limit range of the time relay 41 (time limit, for example, may equal 5 min), in the event of irregular deviation of the clamping means 8 of the contact shoes 7 from a preset position taken as a point of reference.

The above statement will be further explained by the following examples illustrating possible modes of operation of the apparatus.

In the case of upward displacement of the cross beam 10 (or of the tip of the electrode 1) effected by means of the hydraulic plungers 2, for example, in the event of accidental downfall of the charge material resulting in the temporary failure of the technological process, the electric transducer 25 delivers a signal to the dependable correction unit 43 and the intermediate electromagnetic relays (not shown) operate to break the electric circuits connecting the time relay 41 with the sliding spool flow control valve 14 and the control unit 42. During this temporary failure it will be unnecessary to make up for the burned tip of the electrode 1, since it might take much more time for the elimination of the process failure than for the melting down of the electrode tip. Therefore, despite the fact the time relay 41 is triggered at a given moment, the signal delivered therefrom will not actuate the apparatus elements enabling the slipping of the electrode 1. If, however, the cross beam 10 and, consequently, the tip of the electrode 1 will continue, even if temporarily hindered, their downward movement, the electric transducer 25 delivers a signal to the correction unit 43 of the programming device 26, whereupon the intermediate electromagnetic relays are actuated to make the electric circuits connecting the time relay 41 with the sliding spool flow control valve 14 and control unit 42. At a preset time all the actuating mechanisms and elements of the apparatus respond to the command of the time relay 41, thereby enabling the slipping of the electrode 1.

Strictly speaking, the electrode slipping operation is not continual but intermittent, and is effected in accordance with a preset program. But since the length of its slipping, with the sliding spool flow control valve 14 and slide valve 13 being actuated within an interval of 5 to 8 min, amounts, respectively, to 1.25 mm and 1.6 mm times per operating cycle, at the rate of operation of 12 to 7.5 times per hour, it is safe to say that the electrode slipping process is continuous in time and is independent of an operator.

With regard to the second embodiment of the programming device 26, the intermittence of the electrode slipping process is more obvious as compared to the first instance. But, taking into account the fact that the total length for which the electrode is moved daily remains unaltered for a given electric furnace and technological process, it is permissible to characterize the electrode slipping process as continuous in time.

The present invention makes it possible to fully automate not only the operation of the electrode slipping mechanisms but the electrode slipping process as well.

The continuous electrode slipping process is carried out independently of the furnace power automatic regulator effective to control the electrode displacement, thus making for more effective power input regulation and creating favourable conditions for automatic comprehensive control of the furnace operation.

This invention makes it possible to effect both direct and reverse slipping of the electrode.

With the present invention it becomes possible to carry out the electrode slipping process in accordance with the position of the electrode tip in the furnace hearth.

Reequipment of the known furnaces utilizing the electrode-slipping equipment of the invention will not involve great expences and makes provision for the use of separate elements making up the known furnaces.

The invention makes it possible to automate not only the electrode slipping mechanisms but the electrode slipping process as a whole.

In the event of using a self-baking electrode, the present invention makes it possible to improve coking conditions and the electrode quality, and decreases the possibility of the electrode breaking by maintaining stable temperature in the electrode and a requisite position of the coking zone.

This invention also prevents the sticking of the electrode in the contact shoes due to forced displacement of the electrode during its slipping.

The application of the present invention permits the working height of a workshop to be decreased by 3 to 4 meters owing to more compact construction of the electrode-slipping apparatus.

The hydraulic-operated electrode-slipping apparatus of the invention is versatile in that it permits the slipping of both self-baking and pressed electrodes, as well as electrodes of various shapes, for example, annular, oval, rectangular, etc.

Economic efficiency of the electrode-slipping apparatus of the invention is governed by the following factors:

manual labor is completely eliminated, the operating process is fully automated and the operator's work is facilitated;

continuous furnace operation is enabled by preventing the breaking of self-baking electrodes due to improved coking conditions thereof; and the furnace operating conditions are not upset by a failure in the electrode slipping process, in other words, the furnace production efficiency is enhanced.

The apparatus of the invention is highly reliable in operation due to independent operation of the electrode slipping mechanisms and the absence of the interlocking gears.

What is claimed is:

1. In an electric furnace comprising an electrode, contact shoes effecting electric contact with the electrode and provided with clamp means and hydraulic mechanisms, and a hydraulic fluid pressure control unit including pressure-reducing valves and slide valves and set in the hydraulic fluid pressure and drain line of said hydraulic mechanisms and said clamp mechanism, an apparatus for continuous slipping of the electrode comprising:

a hydraulic hoist lifting the electrode and being rigidly connected with said clamp means, said hydraulic hoist including hydraulic plungers and a cross beam interconnecting said hydraulic plungers;

a support structure on which said hydraulic plungers are mounted;

hydraulic mechanisms enabling the slipping of said electrode and mounted on said cross beam of said hydraulic hoist;

a first slide valve controlling said electrode-slipping hydraulic mechanisms and being set in the hydraulic fluid pressure and drain line of the electrode-slipping hydraulic mechanisms;

a sliding spool flow control valve continuously effecting the meter-out flow control in the electrode-slipping hydraulic mechanisms, said sliding spool flow control valve being set between said hydraulic electrode-slipping mechanisms and said first slide valve in the fluid pressure and drain line and connected therewith;

a locking ring connected with said hydraulic electrode-slipping mechanisms and including gripping means intermittently holding said electrode;

a second slide valve controlling said locking ring and being set in the hydraulic fluid supply line of said locking ring and connected therewith;

an upper end switch limiting upward movement of said locking ring;

a lower end switch limiting downward movement of said locking ring; and a programming device having six outputs respectively connected to spools of said first slide valve, said second slide valve, and said sliding spool flow control valve and to the hydraulic fluid pressure control unit, and two inputs respectively connected to said upper and lower end switches.

2. An apparatus for continuous slipping of an electrode as claimed in claim 1, wherein said hydraulic fluid pressure control unit comprises two parallel branches each of which comprising a pressure-reducing valve, a slide valve and a manometer.

3. An apparatus for continuous slipping of an electrode as claimed in claim 1, further comprising a pressure control valve enabling a requisite pressure of hydraulic fluid necessary for steady operating conditions of the apparatus, said pressure control valve being set in the hydraulic fluid drain line of the first slide valve and connected therewith.

4. An apparatus for continuous slipping of an electrode as claimed in claim 1, further comprising:

a hydraulic fluid pressure instantaneous relief valve effecting instantaneous pressure relief in the clamping means of the contact shoes, said pressure relief valve being set in the hydraulic fluid drain line of the hydraulic mechanisms of said clamp means and connected to a seventh output of said programming device; and an electric manometer connected with said hydraulic fluid pressure instantaneous relief valve and with a third input of said programming device.

5. An apparatus as claimed in claim 1, further comprising an electric transducer connected with said clamp of said contact shoes and with a third input of said programming device and following the slipping process of said electrode and correcting the distance of its slipping.

6. An apparatus as claimed in claim 2, further comprising a pressure control valve maintaining a requisite hydraulic fluid pressure head needed to ensure steady operating conditions of the apparatus, said pressure control valve being set in the hydraulic fluid drain line of said first slide valve and connected therewith.

7. An apparatus as claimed in claim 2, further comprising:

a hydraulic fluid pressure instantaneous relief valve effecting instantaneous relief of pressure in the clamp means of the contact shoes, said pressure relief valve being set in the hydraulic fluid drain line of the hydraulic clamping mechanisms of said clamp means and connected to a seventh output of said programming device; and an electric manometer connected with said instantaneous pressure relief valve and with a thrid input of said programming device.

8. An apparatus as claimed in claim 2, further comprising an electric transducer connected with said clamp means of said contact shoes and with a third input of said programming device, said transducer following the process of slipping of said electrode and correcting the slipping distance thereof.

9. An apparatus as claimed in claim 3, further comprising an electric transducer connected with said clamp means of said contact shoes and with a third input of said programming device, said transducer following the process of slipping of said electrode and correcting the slipping distance thereof.

10. An apparatus as claimed in claim 4, further comprising an electric transducer connected with said clamp means of said contact shoes and with a fourth input of said programming device, said transducer following the process of slipping of said electrode and correcting the slipping distance thereof.

11. An apparatus as claimed in claim 6, further comprising an electric transducer connected with said clamp means of said contact shoes and with a third input of said programming device, said transducer following the process of slipping of said electrode and correcting the slipping distance thereof.

* * * * *